United States Patent Office 2,894,930
Patented July 14, 1959

2,894,930

SILOXANE CASTING RESINS

Harold A. Clark, Midland, Mich., assignor to Dow Corning Corporation, Midland, Mich., a corporation of Michigan No Drawing. Application July 17, 1956
Serial No. 598,264

2 Claims. (Cl. 260—42)

This invention relates to phenylvinylsiloxane casting resins and is a continuation-in-part of applicant's co-pending application Serial No. 577,672, filed April 12, 1956, now abandoned.

Commercially useable organosilicon casting resins are described and claimed in U.S. Patent 2,714,099. These materials comprise certain copolymers of phenylvinyl-siloxane and phenylmethylsiloxane which may or may not contain end-blocking groups. When these materials are cured with organic peroxides or other catalysts, they give tough, flexible, commercially useful resins. However, the best strengths are obtained from copolymers having a viscosity in excess of 5,000 cs., preferably 25,000 cs. or higher. Whereas such materials can be cast in certain applications, there are other applications where it is undesirable or impossible to use a material having such a high viscosity. If phenylvinylsiloxane-phenylmethylsiloxane copolymers below 5,000 cs. (i.e. from 100 to 3,000 cs.) are employed, the cured resins have lower physical strengths. Thus even though the low viscosity copolymers can be properly cast or used to impregnate articles, the strength of the cured resin is less than that desired for many applications.

Consequently the problem posed is how to obtain a low viscosity material (that is one below 5,000 cs.) which can be utilized both as casting resins and as impregnating resins and which still retains the desirable physical properties of the high viscosity resins of the aforesaid patent. This retention of strength must also be accomplished without deterioration of the good thermal stability of phenylmethylsiloxane-phenylvinylsiloxane resins. Applicant has solved the problem with the compositions of this invention.

It is the object of this invention to provide a novel composition of matter of sufficiently low viscosity that it will combine the maximum castability and impregnation properties with the maximum physical strength and thermal stability in the cured resin. Further objects and advantages will be apparent from the following description.

In this application Vi represents the vinyl radical, Me the methyl radical and Ph the phenyl radical.

This invention relates to compositions consisting essentially of (1) from 5 to 75% by weight of a composition of the group symmetrical dimethyldiphenyldivinyldisiloxane,

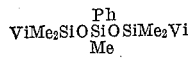

and

and (2) from 25 to 95% by weight of a polysiloxane in which the polymer units are of the group monovinylsiloxane units, phenylvinylsiloxane units, monophenyl-siloxane units, phenylmethylsiloxane units, monomethyl-siloxane units and diphenylsiloxane units, which polysiloxane can contain up to 20 mol percent siloxane units of the formula $R_3SiO_{.5}$ in which R is of the group methyl, vinyl and phenyl radicals, at least 10 mol percent of the units in said polysiloxane (2) being vinylsiloxane units and the phenyl to silicon ratio in said polysiloxane (2) being from .25:1 to 1.1:1.

The novel disiloxane of this invention may be prepared by reacting methylvinyldichlorosilane with a phenyl Grignard to produce methylphenylvinylchlorosilane and thereafter hydrolyzing the chlorosilane and condensing the hydrolyzate by heating with potassium acetate in refluxing toluene. The novel trisiloxanes may be prepared by cohydrolyzing $Me_2ViSiCl$ with $Ph_2SiCl_2$, $PhMeSiCl_2$ or $PhViSiCl_2$ in the conventional manner.

The casting resins of this invention are prepared by mixing the siloxanes (1) with polysiloxane (2). The mixture can be cured by heating the mixture with organic peroxides or other suitable catalysts whereby there is a polymerization via the vinyl groups in the various ingredients. The amount of peroxide catalyst is not critical. The resulting resin is a copolymer of siloxanes (1) and polysiloxane (2). It should be understood that siloxanes (1) can be used individually with (2) or two or more of siloxanes (1) can be combined with (2).

Any organic peroxides can be employed to cure the resins of this invention. Typical examples of such peroxides are acetylperoxide, tertbutylperbenzoate, benzoylperoxide, tertbutylhydroperoxide, tertbutylperacetate, cumylhydroperoxide, 2,4-dichlorobenzoylperoxide, dicumylperoxide and p-tertbutylisopropylbenzenehydroperoxide.

It has been found that the higher the molecular size of polysiloxane (2) in the mixture, the higher will be the physical strength of the cured resin. Also the flexibility of the cured resin can be varied by varying the mol percent of vinylsiloxane in polysiloxane (2).

The compositions of this invention may be cast into any desired shape by conventional techniques. These resins may also be used to impregnate coils, transformers, or other intricate apparatus by standard techniques such as vacuum impregnation.

The compound

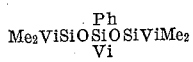

imparts more hardness to the cured resin than the other compositions included in siloxane (1).

If desired, fillers such as metal oxides, silica, carbon black, glass fabric, asbestos, glass fibers, glass beads, and clays may be incorporated in the resins of this invention in any desired proportion. Fillers are often advantageously used to improve specific properties such as to reduce the coefficient of expansion of the cast or molded article. This may prevent cracking around embedded metal parts or other embedded materials having coefficients of expansion widely different from that of the base resin.

It can be seen that polysiloxane (2) employed in the compositions of this invention can be either phenylvinyl-siloxane or copolymers of certain combinations of mono-vinylsiloxane, phenylvinylsiloxane, monophenylsiloxane, phenylmethylsiloxane, monomethylsiloxane and diphenylsiloxane. These copolymers may contain up to 20 mol percent of triorganosiloxanes such as trimethylsiloxane, triphenylsiloxane, dimethylphenylsiloxane, diphenylmethylsiloxane, dimethylvinylsiloxane, diphenylvinyl-siloxane and methylphenylvinylsiloxane. Preferably when the mol percent of triorganosiloxane is above 10 mol percent there should be vinyl groups on the ends of the chains of (2). In all the copolymers the mol percent of vinylsiloxane (i.e. any of the defined units having a vinyl radical attached to the Si) must be at least 10 mol percent and the ratio of phenyl radicals to silicon must be at least .25:1 and not greater than 1.1:1. If the phenyl to silicon ratio is outside these ranges, inferior resins are obtained.

The compositions of this invention give better handling properties, improved castability (as shown by freedom from cracks and voids), harder cured resins, improved compressive strength and improved flexibility over the heretofore known phenylvinyl-phenylmethylsiloxane casting resins and over heretofore known methylvinyl resins.

The following examples are illustrative only and should not be construed as limiting the invention which is properly delineated in the appended claims.

Example 1

This example shows that the strength of the compositions of this invention are as good or better than the compositions of the undiluted resin.

The sym-dimethyldiphenyldivinyldisiloxane employed in these examples was prepared as shown above. This compound has the following properties: B.R. 155 to 160° C. at 5 to 6 mm., $d_4^{25}$ 0.9958, $n_d^{25}$ 1.5310 and viscosity at 25° C. 4.7 cs.

A polysiloxane (A) having a viscosity of 25,000 cs. and a composition of 50 mol percent phenylvinylsiloxane and 50 mol percent phenylmethylsiloxane was mixed with 1% by weight di-t-butylperoxide and thereafter heated 8 hours at 150° C. and 6 hours at 200° C. The compressive strength of the resulting material at 74° F. was 15,000 p.s.i.

A mixture of 75% by weight of polysiloxane (A) and 25% by weight of diphenyldimethyldivinyldisiloxane had a viscosity of 2,000 cs. This mixture was cured in an identical manner as that above and the resulting product had a compressive strength at 74° F. of 15,300 p.s.i.

Example 2

A mixture having the composition 60% by weight of a 1,500,000 cs. copolymer of 50 mol percent phenylvinylsiloxane and 50 mol percent phenylmethylsiloxane and 30% by weight of the disiloxane of Example 1 had a viscosity of 50,000 cs. This mixture was cured in the manner of Example 1 and the compressive strength of the resin was 15,000 p.s.i.

Example 3

A mixture of 75% by weight of a 3,000 cs. copolymer of 40 mol percent phenylvinylsiloxane and 60 mol percent phenylmethylsiloxane and 25% by weight of the disiloxane of Example 1, had a viscosity of 300 cs. This mixture was cured in accordance with the procedure of Example 1 and the resulting material had a compressive strength at 74° F. of 12,000 p.s.i. The 300 cs. mixture was excellent for impregating electrical coils.

Example 4

A mixture of 75% by weight of a solid copolymer of 33⅓ mol percent each of monovinylsiloxane, monophenylsiloxane and phenylmethylsiloxane and 25% by weight of the disiloxane of Example 1, had a viscosity of about 5,000 cs. and was cured in the manner of Example 1. The resulting product was a hard, strong resin.

Example 5

A mixture of 75% by weight of a copolymer of 2 mol percent phenylmethylvinylsiloxane, 39 mol percent phenylvinylsiloxane and 50 mol percent phenylmethylsiloxane and 25% by weight of the disiloxane of Example 1, had a viscosity of 2,000 cs. This mixture was cured in the manner of Example 1 and had a compressive strength of 16,000 p.s.i. and a compressive modulus of $2 \times 10^5$ p.s.i., both at 74° F.

Example 6

Results equivalent to those of Example 4 were obtained when a mixture of 75% by weight of a copolymer containing 33⅓ mol percent each of monovinylsiloxane, monomethylsiloxane and phenylmethylsiloxane and 25% by weight of the disiloxane of Example 1 was cured in the manner of that example.

Example 7

A mixture of 50% by weight of a copolymer of 25 mol percent phenylvinylsiloxane and 75 mol percent phenylmethylsiloxane having a viscosity of 3,900,000 cs. and 50% by weight of the disiloxane of Example 1, had a viscosity of 2,000 cs. When this material was cured in accordance with the method of Example 1, a tough, flexible resin was obtained.

Example 8

Equivalent results are obtained when a mixture of 25% by weight of the disiloxane of Example 1 and 75% by weight of 1,000,000 cs. phenylvinylpolysiloxane is cured in accordance with that example.

Example 9

70% by weight of a copolymer of 29.3 mol percent phenylvinylsiloxane, 62 mol percent phenylmethylsiloxane and 8.4 mol percent phenylmethylvinylsiloxane having a viscosity of 7,400 cs. was diluted with 30% by weight of the composition

The resulting mixture had a viscosity of about 800 cs. 1% by weight ditertiarybutylperoxide was added to the mixture which was then heated 16 hours at 150° C. The resulting resin had properties equivalent to those of Example 1.

Example 10

75% by weight of a copolymer of 60 mol percent phenylmethylsiloxane and 40 mol percent phenylvinylsiloxane having a viscosity of 2,500 cs. was diluted with 25% by weight of

The resulting fluid mixture was mixed with 1% by weight ditertiarybutylperoxide and heated at 150° C. for 16 hours. The resulting resin was tough and flexible.

Example 11

A mixture of 75% by weight of a copolymer of 60 mol percent phenylmethylsiloxane and 40 mol percent phenylvinylsiloxane having a viscosity of 2,500 cs. and 25% by weight of

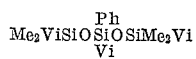

was prepared. 1% by weight of ditertiarybutylperoxide was added and the mixture was then heated 16 hours at 150° C. The resulting resin was hard and brittle.

That which is claimed is:

1. A composition of matter consisting essentially of (1) from 5 to 75% by weight of a compound of the group consisting of symmetrical dimethyldiphenyldivinyldisiloxane,

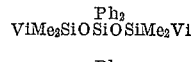

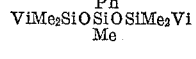

and

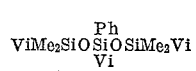

where Me, Ph and Vi represent the methyl, phenyl and vinyl radicals respectively, and (2) from 25 to 95% by weight of a polysiloxane in which the polymer units are selected from the group consisting of monovinylsiloxane, phenylvinylsiloxane, monophenylsiloxane, phenylmethylsiloxane, monomethylsiloxane and diphenylsiloxane and up to 20 mol percent siloxane units of the formula $R_3SiO_{.5}$ in which R is of the group consisting of vinyl, methyl and phenyl radicals, in said polysiloxane (2) at least 10 mol percent of the units being vinylsiloxane units and in said polysiloxane (2) the phenyl to silicon ratio being from .25:1 to 1.1:1 and (3) a peroxide curing agent.

2. A copolymer of components consisting essentially of (1) from 5 to 75% by weight of a compound of the group consisting of symmetrical dimethyldiphenyldivinyldisiloxane,

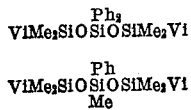

and

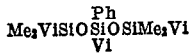

where Me, Ph and Vi represent the methyl, phenyl and vinyl radicals respectively, and (2) from 25 to 95% by weight of a polysiloxane in which the polymer units are selected from the group consisting of monovinylsiloxane, phenylvinylsiloxane, monophenylsiloxane, phenylmethylsiloxane, monomethylsiloxane and diphenylsiloxane and up to 20 mol percent siloxane units of the formual $R_3SiO_{.5}$ in which R is of the group consisting of vinyl, methyl and phenyl radicals, in said polysiloxane (2) at least 10 mole percent of the units being vinylsiloxane (2) at least 10 mol percent of the units being vinylsiloxane units and in said polysiloxane (2) the phenyl to silicon ratio being from .25:1 to 1.1:1.

References Cited in the file of this patent

UNITED STATES PATENTS

| | | |
|---|---|---|
| 2,645,628 | Hurd | July 14, 1953 |
| 2,714,099 | Weyenberg | July 26, 1955 |
| 2,716,638 | Cohen et al. | Aug. 30, 1955 |
| 2,756,246 | Burkhard | July 24, 1956 |
| 2,831,010 | Clark et al. | Apr. 15, 1958 |

UNITED STATES PATENT OFFICE
CERTIFICATE OF CORRECTION

Patent No. 2,894,930                                         July 14, 1959

Harold A. Clark

It is hereby certified that error appears in the printed specification of the above numbered patent requiring correction and that the said Letters Patent should read as corrected below.

Column 6, line 8, for "formual" read -- formula --; lines 10 and 11, strike out "(2) at least 10 mole percent of the units being vinylsiloxane".

Signed and sealed this 1st day of December 1959.

(SEAL)
Attest:

KARL H. AXLINE                                               ROBERT C. WATSON
Attesting Officer                                           Commissioner of Patents